Jan. 24, 1961    J. A. LUCEY    2,969,454
WELDING METHOD AND APPARATUS
Filed Nov. 18, 1958    3 Sheets-Sheet 1
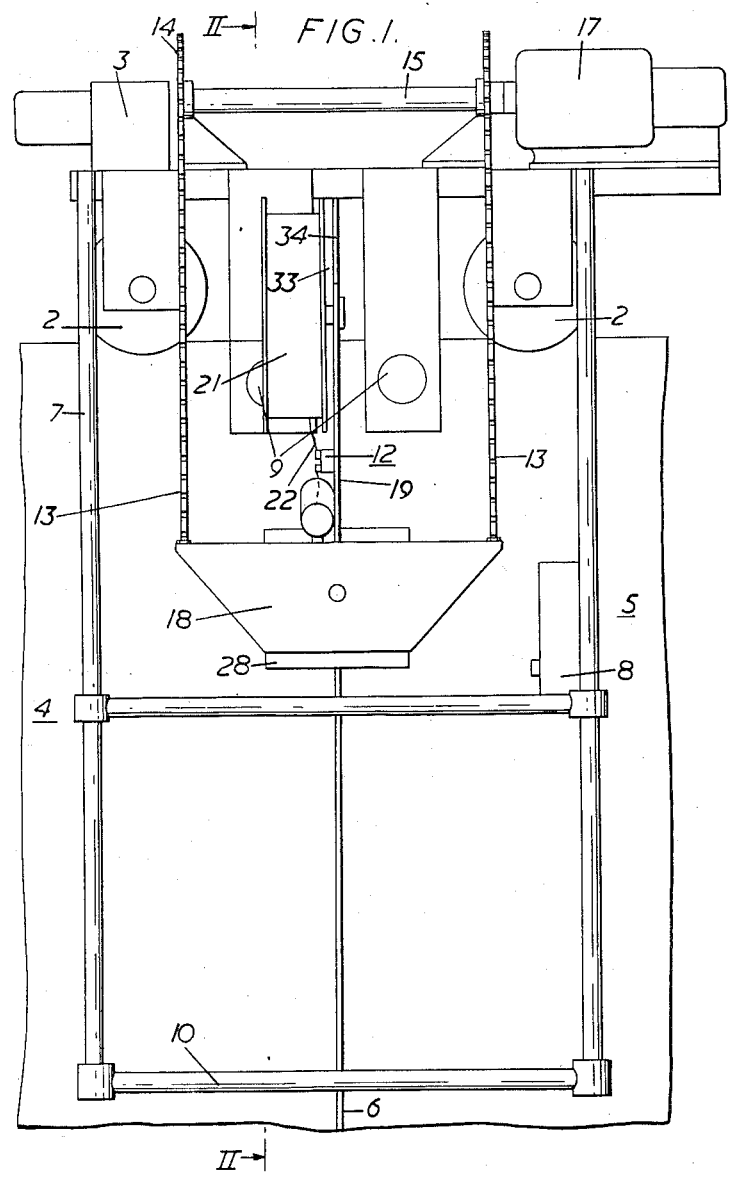
Inventor
JOHN ANTHONY LUCEY
By
Aaron R. Townshend    Attorney

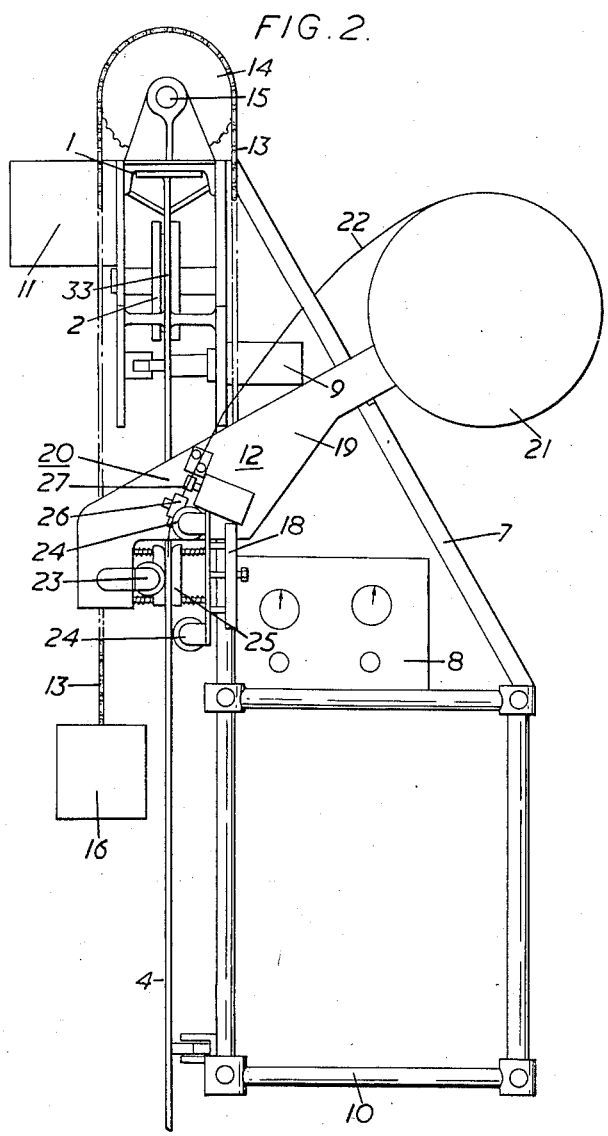

Jan. 24, 1961  J. A. LUCEY  2,969,454
WELDING METHOD AND APPARATUS
Filed Nov. 18, 1958  3 Sheets-Sheet 3
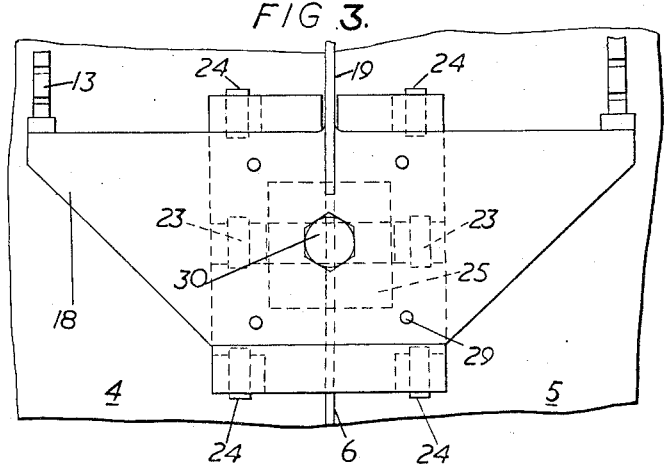
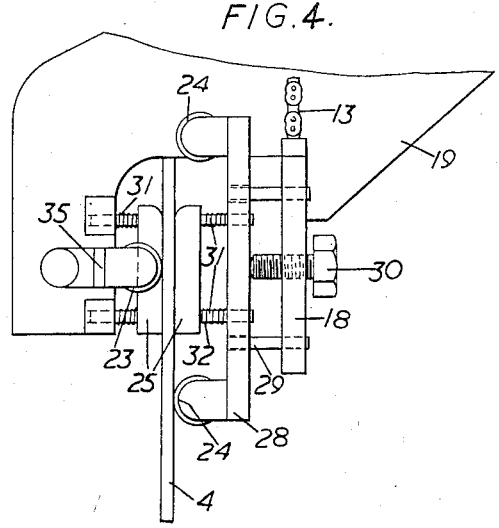
Inventor
JOHN ANTHONY LUCEY
By
Aaron R. Townshend Attorney

United States Patent Office 2,969,454
Patented Jan. 24, 1961

2,969,454

WELDING METHOD AND APPARATUS

John A. Lucey, Newcastle-on-Tyne, England, assignor to The British Oxygen Company Limited, a British company Filed Nov. 18, 1958, Ser. No. 774,616

Claims priority, application Great Britain Nov. 18, 1957

6 Claims. (Cl. 219—126)

This invention relates to a method and apparatus for the seam welding of metal plates or the like, and has particular though not exclusive application to the seam welding of oil storage tanks during their erection on site, and to the fabrication of ships' hulls.

Oil storage tanks are frequently constructed of a number of upright curved steel plates welded edge to edge to form a cylinder standing on one of its ends. The welding may be performed either manually or automatically, and in the latter case use may be made of apparatus consisting of a carriage which is movable along the upper edge of the top plate or ring of plates. The carriage straddles the plate and is arranged to support a welding head on one or, more generally, both sides of the seam. A similar apparatus may be used when fabricating certain parts of ships' hulls.

A disadvantage of the apparatus just described is that it has been necessary for the plate edges to be accurately aligned and tack welded before the apparatus can be brought into operation. The time taken to set up the apparatus ready for use thus tends to outweigh the time gained by the increased speed of welding compared with manual welding. It is one object of the present invention to provide a method and apparatus which allows a reduction in the amount of setting up which is required before the welding of seams between upright metal plates or the like can be commenced.

It should be appreciated that the plates need not necessarily be flat and may be curved.

According to the present invention, apparatus for use in welding a vertical seam between upright plates set up edge to edge with a gap between adjacent edges comprises stationary positioning means adapted to maintain the upper edges of the plates in welding relationship, a welding head assembly including a member adapted to extend through said gap and including movable positioning means arranged to bear against both sides of said plates and maintain the plates in correct alignment at the point of welding, and means for raising the welding head assembly at a suitable welding speed.

The welding head assembly preferably includes a pair of retaining shoes which are adapted to bridge the gap between the plates and support molten weld metal in the seam.

The stationary positioning means, welding head assembly, and means for raising the welding head assembly may be mounted on a carriage for movement along the upper edges of the plates being welded. This carriage may support a plate member onto which the welding head assembly can move clear of the plates being welded at the upper end of the seam, this plate member being slotted to receive said member adapted to extend through said gap.

One construction of welding apparatus in accordance with the present invention is particularly adapted for the welding of vertical seams between upright metal plates such as are used in the fabrication on site of cylindrical oil storage tanks and the like. The metal plates or sheets used in the construction of such tanks are generally of steel and may be curved, particularly for cylindrical tanks of small diameter, or may be flat.

This construction of welding apparatus will now be described by way of example with reference to the accompanying diagrammatic drawings in which:

Fig. 1 is a front elevation of the apparatus set up for use on a pair of plates to be welded together;

Fig. 2 is a side elevation taken on the line 11—11 in Fig. 1;

Fig. 3 is a front view, to a larger scale, of the parts of the apparatus in the neighborhood of the welding point, and Fig. 4 is a side elevation of the parts shown in Fig. 3.

Referring to Figs. 1 and 2 of the drawings, the apparatus includes a carriage 1 having two wheels 2, one of which is power driven by a motor 3, adapted to move along the upper edge of the plates 4 and 5 to be welded together along a vertical seam 6. Mounted on the carriage 1 and extending on both sides of the upper portions only of the plates 4 and 5 are stationary positioning means which in this case include two pairs of compressed air operated clamps 9. Alternatively clamps operated by hydraulic pressure or other means may be used. Also mounted on the carriage 1 and extending on one side of the plates 4 and 5 is a framework 7. A platform 10 for an operator may be included in the framework 7 at the side of the plates. The framework is counter-balanced by a weight 11 and welding controls and indicators are mounted on the framework at 8.

A welding head assembly 12 is suspended from the framework 7 at the side of the plates by means of chains 13 passing over sprockets 14 which are mounted on a shaft 15 carried by the framework 7 with the shaft axis parallel to or tangential to the upper edge of the plates 4 and 5. The head assembly 12 is counterbalanced by two balance weights 16 (see Fig. 2) at the ends of the chains 13. The shaft 15 is driven by a variable speed motor 17 through a reduction gear, thereby raising the welding head assembly 12 at a speed which may be automatically controlled to a suitable value for vertical welding of the seam 6.

The welding head assembly 12 includes a yoke member 18 to which one end of each chain 13 is secured, and a web plate 19 which is fixed at right angles to the yoke member 18 so as to extend through a vertical gap between the plates 4 and 5 to be welded. Support for an automatic welding head 20 of any suitable type having a contact member 26 arranged to feed welding current to an electrode wire 22 which is continuously fed through the contact member by a motor driven feed roll 27, and for a reel 21 of continuous electrode wire 22 is provided by the web plate 19. The web plate also supports a pair of non-adjustable rollers 23 resiliently mounted by means of a rubber pad 35 and adapted to bear against one side of the two plates 4 and 5 to be welded together, and two pairs of adjustably mounted rollers 24 which are adapted to bear against the other side of the plates. These rollers run along parallel to the seam and together constitute movable positioning means for ensuring that the edges of the plates at this point are in alignment. The welding head assembly also includes a pair of retaining shoes 25 of copper or other material, mounted below the welding head 20 on either side of the seam 6 and spring loaded against the plates 4 and 5 to support molten weld metal in the seam during welding. The retaining shoes 25 may be water cooled if necessary.

A dummy slotted plate 33 carried by the stationary positioning means is arranged to be positioned with a slot 34 in this plate in line with the seam 6 when welding is to take place. Before the carriage 1 is to be moved along the upper edge of the plates the welding head assembly is raised until the web plate 19 extends through this slot 34.

Figs. 3 and 4 show to a larger scale the parts of the welding apparatus in the neighbourhood of the welding point. The yoke member 18, which is supported by the chains 13, has secured thereto at right angles the web plate 19. Resiliently mounted on this web plate by the rubber pad 35 at one side of the plates 3 and 4 are the pair of fixed rollers 23. At the other side of the plates 3 and 4 are the two pairs of rollers 24 which are carried by a support plate 28 which is parallel to and is supported on the yoke member 18. Four parallel pins 29 mounted on this support plate and engaging in holes in the yoke member allow limited relative movement of this support plate parallel to the yoke member, and a bolt 30 screw threaded through the yoke member engages the support plate to adjust the normal distance between the rollers 23 and 24 as may be required when welding plates 3 and 4 which are of different thickness to those normally welded. It will be observed that the retaining shoes 25 are mounted on pins 31 and biased towards each other by springs 32. At one side of the plates 3 and 4 the pins 31 are mounted directly on the web plate 19 whereas at the other side the pins 31 are mounted on the support plate 28. Thus adjustment of the rollers by means of the bolt 30 to accommodate a different thickness of plate may also effect an adjustment of the retaining shoes 25.

When setting up for welding it is necessary to position the plates 4 and 5 with the required gap for welding of approximately one inch. This can be done by inserting a temporary spacer bar in between the plate edges. Alignment of the joint edges needs to be set only approximately to within ¼ inch to ½ inch, temporary manually operated clamps (not shown) being used where necessary. The carriage 1 is then moved along the upper edge of the plates 4 and 5 until the web plate 19 is disposed above the gap between these plates. The compressed air operated clamps 9 are operated to engage the plates 4 and 5 near to their upper edges and thereby automatically position the edges of the plates at the upper end of the seam 6 in welding relationship. The welding head assembly 12 is then lowered by means of the chains 13 to the lower end of the seam. The movable positioning means embodying rollers 23 and 24 act in the vicinity of the welding head assembly 12 to align the plates 4 and 5 at the point of welding. Metal arc welding is then commenced, an arc being established between the tip of the continuous electrode wire 22 and the plates being welded, and the electrode wire 22, which may be bare, with or without a flux-filled core, or flux covered, and which may be used in conjunction with a gas shield and/or a powdered flux, is fed automatically to maintain the arc. At the same time, the variable speed motor 17 drives the chains 13 to raise the welding head assembly 12 along the length of the seam 6 at a desired speed. The retaining shoes 25, which are pressed against the plates 4 and 5 on either side of the seam 6 in the vicinity of the arc, support the molten weld metal in the seam 6 as it solidifies and support any slag covering the upper surface of the weld metal. The welding head assembly 12 is raised at a speed which ensures that the weld metal deposited at any point in the seam 6 has become self-supporting by the time that the retaining shoes 25 have been raised above that point. As the welding head assembly 12 progresses along the seam the movable positioning means ensures that the plates at the point of welding are maintained in alignment.

At the upper end of the plates 3 and 4, the web plate 19 and the welding head assembly and movable positioning means carried thereby are lifted clear of the plates, the web plate 19 moving into the slot 34 in the dummy plate 33. The compressed air operated clamps 9 are then unclamped and the carriage 1 is moved along the upper edge of the plate until the slot 34 in the dummy plate 33 is in line with the next seam to be welded whereupon the clamps 9 are operated to engage the plates forming the seam. The welding head assembly 12 is then lowered and the procedure set out above is repeated.

I claim:

1. Apparatus for use in welding a vertical seam between upright plates set up edge to edge with a gap between adjacent edges comprising stationary positioning means adapted to maintain the upper edges of the plates in welding relationship, a welding head assembly including a member adapted to extend through said gap and including movable positioning means arranged to bear against both sides of said plates and maintain the plates in correct alignment at the point of welding, and means for raising the welding head assembly at a suitable welding speed.

2. Apparatus in accordance with claim 1, characterised in that the welding head assembly includes a pair of retaining shoes which are adapted to bridge the gap between the plates and support molten weld metal in the seam.

3. Apparatus in accordance with claim 1, characterised in that the stationary positioning means, welding head assembly and means for raising the welding head assembly are mounted on a carriage for movement along the upper edges of the plates being welded.

4. Apparatus in accordance with claim 3, characterised in that the carriage supports a plate member onto which the welding head assembly can move clear of the plates being welded at the upper end of the seam, said plate member being slotted to receive said member adapted to extend through said gap.

5. Apparatus for use in welding a vertical seam between two upright plates set up edge to edge with a gap between adjacent edges, comprising a carriage movable along the upper edges of the plates being welded, clamps mounted on said carriage and adapted when the carriage is stationary to maintain the upper edges of the two plates in welding relationship, a framework mounted on said carriage and extending at one side of the two plates, a welding head assembly suspended from the framework at one side of the two plates, a web plate forming part of the welding head assembly and extending through the gap between the two plates, rollers supported by the web plate and bearing against both sides of the two plates to align the plates at the point of welding, means for adjusting the distance between the rollers on both sides of the plates to accommodate plates of differing thickness, a pair of retaining shoes adapted to bridge the gap between the two plates and support molten metal in the seam, and a motor adapted to raise the welding head assembly at welding speed.

6. Apparatus in accordance with claim 5, wherein a platform for an operator is included in the framework.

References Cited in the file of this patent
UNITED STATES PATENTS

| | | |
|---|---|---|
| 1,826,186 | Morton | Oct. 6, 1931 |
| 2,089,840 | Rockefeller | Aug. 10, 1937 |
| 2,403,221 | Howard | July 2, 1946 |
| 2,737,565 | Meyer | Mar. 6, 1956 |
| 2,794,901 | Christensen | June 4, 1957 |

FOREIGN PATENTS

| | | |
|---|---|---|
| 691,074 | Great Britain | May 6, 1953 |